(12) United States Patent
Tietz et al.

(10) Patent No.: US 12,496,940 B2
(45) Date of Patent: Dec. 16, 2025

(54) LOCKING DEVICE WITH EMERGENCY RELEASE

(71) Applicant: Brose Fahrzeugteile SE & Co. Kommanditgesellschaft, Coburg, Coburg (DE)

(72) Inventors: Sebastian Tietz, Schleusingen (DE); Markus Welsch, Lichtenfels (DE); Michael Knab, Schwürbitz (DE)

(73) Assignee: BROSE FAHRZEUGTEILE SE & CO. KOMMANDITGESELLSCHAFT, COBURG, Coburg (GB)

( * ) Notice: Subject to any disclaimer, the term of this patent is extended or adjusted under 35 U.S.C. 154(b) by 245 days.

(21) Appl. No.: 18/449,503

(22) Filed: Aug. 14, 2023

(65) Prior Publication Data

US 2024/0059195 A1   Feb. 22, 2024

(30) Foreign Application Priority Data

Aug. 22, 2022 (DE) ...................... 10 2022 121 179.7

(51) Int. Cl.
*B60N 2/12* (2006.01)

(52) U.S. Cl.
CPC ..................... *B60N 2/123* (2013.01)

(58) Field of Classification Search
CPC .............................. B60N 2/123; B60N 2/146
See application file for complete search history.

(56) References Cited

FOREIGN PATENT DOCUMENTS

DE    102006022436 A1   11/2007
DE    102018214422 A1   2/2020

*Primary Examiner* — Philip F Gabler
(74) *Attorney, Agent, or Firm* — McCoy Russell LLP (57) ABSTRACT

It is provided a locking device, comprising: a rotary latch pivotally mounted on a housing between a locking position and an unlocking position, a blocking element movable between a blocking position and a release position, by which the rotary latch is blocked in the locking position when the blocking element is arranged in the blocking position, and a driving device that can be activated for moving the blocking element from the blocking position into the release position. There is provided an unlocking element that is pivotally mounted on the housing independently of the driving device and is adapted to urge the blocking element from the blocking position into the release position.

17 Claims, 7 Drawing Sheets

LOCKING DEVICE WITH EMERGENCY RELEASE

CROSS REFERENCE TO RELATED APPLICATION

The present application claims priority to German Patent Application No. 10 2022 121 179.7 filed on Aug. 22, 2022. The entire contents of the above-listed application are hereby incorporated by reference for all purposes.

BACKGROUND

The proposed solution relates to a locking device, e.g. for a vehicle seat and to a vehicle seat comprising such a locking device.

Such locking devices are widely known in the vehicle sector for different fields of application. For example, such locking devices are used on vehicle seats or for locking pivotable or foldable closing elements, such as doors, liftgates, trunk lids or hoods. Such a locking device thus can be configured and provided for example for locking a component of a vehicle seat, for example in order to lock the backrest of a vehicle seat to a seat base or in order to releasably lock a foldable and/or removable vehicle seat to a base, e.g. to a body-mounted vehicle structure.

DE 10 2006 022 436 A1 describes a lock for a flap or door of a vehicle, comprising a housing in which a rotary latch, a pawl serving as a blocking element and associated springs are arranged. A motorized actuation requires an electric motor that drives an eccentric via a spindle, a worm and a worm wheel. The worm wheel and the eccentric are mounted on a bearing pin in the interior of the housing, which bearing pin reaches through a first oblong hole in the pawl. For manual actuation of the pawl, the lock also includes a Bowden cable for an emergency actuation of the pawl. A core of the Bowden cable engages a driver that is guided in a second oblong hole in the pawl. When the emergency actuation is at rest, this oblong hole allows a free pivotal movement of the pawl.

This solution with the two oblong holes, however, has the disadvantage of a relatively large demand of installation space and also tends to jam.

SUMMARY

It is the object to provide an improved locking device.

This object is achieved by a locking device with features as described herein.

Accordingly, a locking device, in particular for a vehicle seat, comprises a rotary latch pivotally mounted on a housing between a locking position and an unlocking position, a blocking element movable between a blocking position and a release position, by which blocking element the rotary latch is blocked in the locking position when the blocking element is arranged in the blocking position, and a driving device that can be activated for moving the blocking element between the blocking position and the release position. There is provided an unlocking element that is pivotally mounted on the housing independently of the driving device and is adapted to urge the blocking element from the blocking position into the release position.

The use of the unlocking element provides for an improved introduction of force, which in turn allows a reduced installation space and counteracts jamming. Thus, an improved locking device is provided in a simple way. The unlocking element for example provides an emergency release.

The blocking element and the unlocking element are, for example, mounted on the housing such that they can pivot coaxially with respect to each other, for example on one and the same bearing pin. This provides for a compact design and a simple construction with few components.

The unlocking element can be configured in the form of a release lever. This provides for the improved introduction of force with a simple construction.

Optionally, the blocking element comprises a driver element e.g. protruding from the remaining blocking element, on which the unlocking element acts during a pivotal movement. This driver element can be arranged relatively close to a pivot axis of the blocking element, which provides for a particularly good introduction of force.

The unlocking element for example has a greater lever length than the driver element. Thereby, in particular manual unlocking via the unlocking element can be facilitated.

The driving device optionally comprises a component, for example in the form of a screw wheel, which is pivotally mounted on the housing in such a way that it acts on an actuating area of the blocking element as a result of an activation of a drive unit. An activation of the drive unit for example causes a rotation of the component (of the screw wheel), and as a result the component e.g. abuts against the blocking element. This provides for a compact motorized actuation.

A surface, e.g. a shell surface, of the driver element, on which the unlocking element acts during a pivotal movement, and the actuating area of the blocking element can be arranged axially offset from each other in the direction of the pivot axis of the blocking element. Motorized and manual unlocking thus can easily be actuated independently of each other.

Optionally, a worm of the driving device is in engagement with a toothing of the screw wheel. This allows a fast transfer of the blocking element into the release position with little demand of installation space.

The screw wheel and the blocking element can be mounted on the housing such that they can pivot coaxially with respect to each other, for example on one and the same bearing pin. This likewise provides for a particularly compact construction.

On the housing, e.g. a stop is formed for the unlocking element. A clearly defined unlocking path can be specified thereby.

Optionally, there is provided a spring by means of which the blocking element is pretensioned in the direction of the blocking position. In the non-actuated state, the blocking element thus always returns into the blocking position.

Optionally, the locking device comprises a clearance compensation element, which is adapted for holding the rotary latch in the locking position without any clearance. Rattling noise and the like can be prevented thereby. The clearance compensation element for example is thinner and/or e.g. made of a softer material than the blocking element, but is arranged e.g. closer to the rotary latch.

The blocking element can be configured such that it entrains the clearance compensation element during a movement from the blocking position into the release position. This provides for a particularly simple construction.

The driving device and the unlocking element can each be movable between a normal position and an actuating position, and in the respective actuating position can urge the blocking element into the release position. It can be provided that the rotary latch, when it is arranged in the unlocking position, is held in the unlocking position (e.g. by means of spring-elastic pretension), when the driving device and the unlocking element are arranged in the respective normal position. Furthermore, it can be provided that the blocking element is (spring-elastically) transferred into the blocking position when the rotary latch is moved into the locking position. Thus, the locking device can be transferred into an open state in which it can be closed and blocked by mere introduction of a counter-locking element, e.g. a bolt. This state can be referred to as ready-to-lock state.

Optionally, there is provided a flexible traction means coupled to the unlocking element, by means of which the unlocking element can be put into a pivotal movement. This allows an intuitive arrangement of a handle (or another actuating device) coupled to the traction means.

According to one aspect, there is indicated a vehicle seat comprising the locking device according to an arbitrary embodiment described herein. As regards the advantages reference is made to the above indications.

A seat part of the vehicle seat is connectable or connected to a vehicle floor e.g. via a base of the vehicle seat. The seat part can be capable of being locked to the base by means of the locking device, for example concretely to a bolt of the base.

BRIEF DESCRIPTION OF THE DRAWINGS

The idea underlying the solution will be explained in detail below with reference to the exemplary embodiments illustrated in the Figures.

DETAILED DESCRIPTION

Figures 1A, 1B:
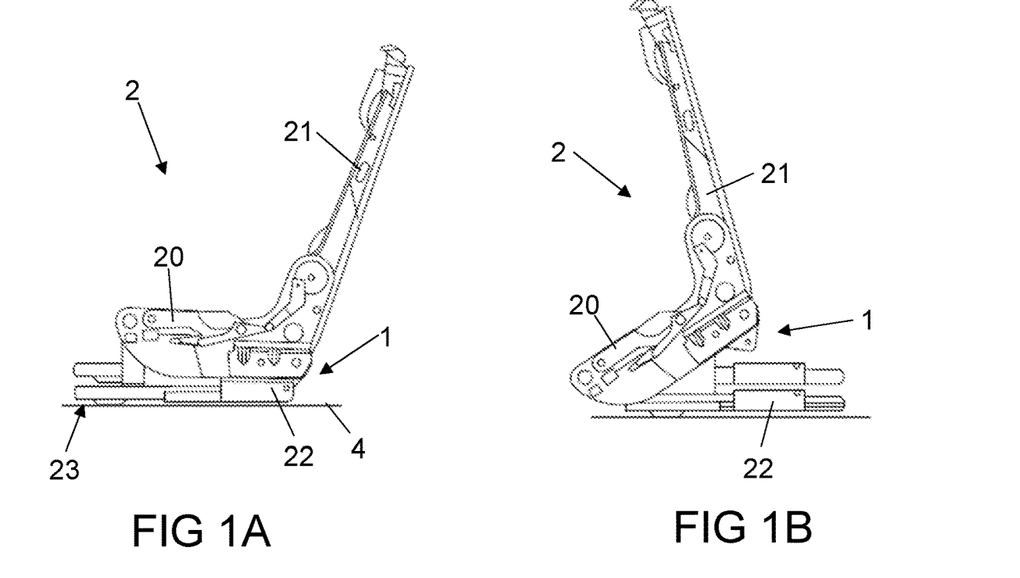
FIG. 1A shows a vehicle seat in a position of use, in which a seat part is releasably locked to a base by means of a locking device.
FIG. 1B shows the vehicle seat of FIG. 1A in an easy-entry position folded forwards, in which the locking device is released.

FIG. 1A shows a vehicle seat 2 comprising a seat part 20 and a backrest 21. The vehicle seat 2 furthermore comprises a base 22 on which the seat part 20 is mounted and supported. Furthermore, the vehicle seat 2 comprises a longitudinal adjustment device 23 via which the vehicle seat 2 is mounted on a vehicle floor 4 of a vehicle. Floor-side rails are attached to the vehicle floor 4 and the seat part 20 is mounted on seat-side rails longitudinally shiftable relative to the floor-side rails. In the present case, the seat-side rails serve as a base 22. Alternatively, the vehicle seat 2 might be mounted directly on the vehicle floor 4 without a longitudinal adjustment device. In this case, e.g. a component attached to the vehicle floor 4 or an area of the vehicle floor 4 would serve as a base.

FIG. 1A shows the vehicle seat 1 in a seatable position of use. In the position of use, a seat user can take a seat on the vehicle seat 2. FIG. 1B shows the vehicle seat in a position folded forwards as compared to the position of use, which can also be referred to as an easy-entry position. Here, in particular the seat part 20 is pivoted forwards relative to the base 22. In the easy-entry position, e.g. entry into a rear seat row can be facilitated.

For this purpose, the vehicle seat 2 comprises a locking device 1 which in the position of use is locked to the base 22 and can be released for transferring the vehicle seat 2 from the position of use into the easy-entry position. The locking device 1 will be explained in detail below.

Figure 2A:
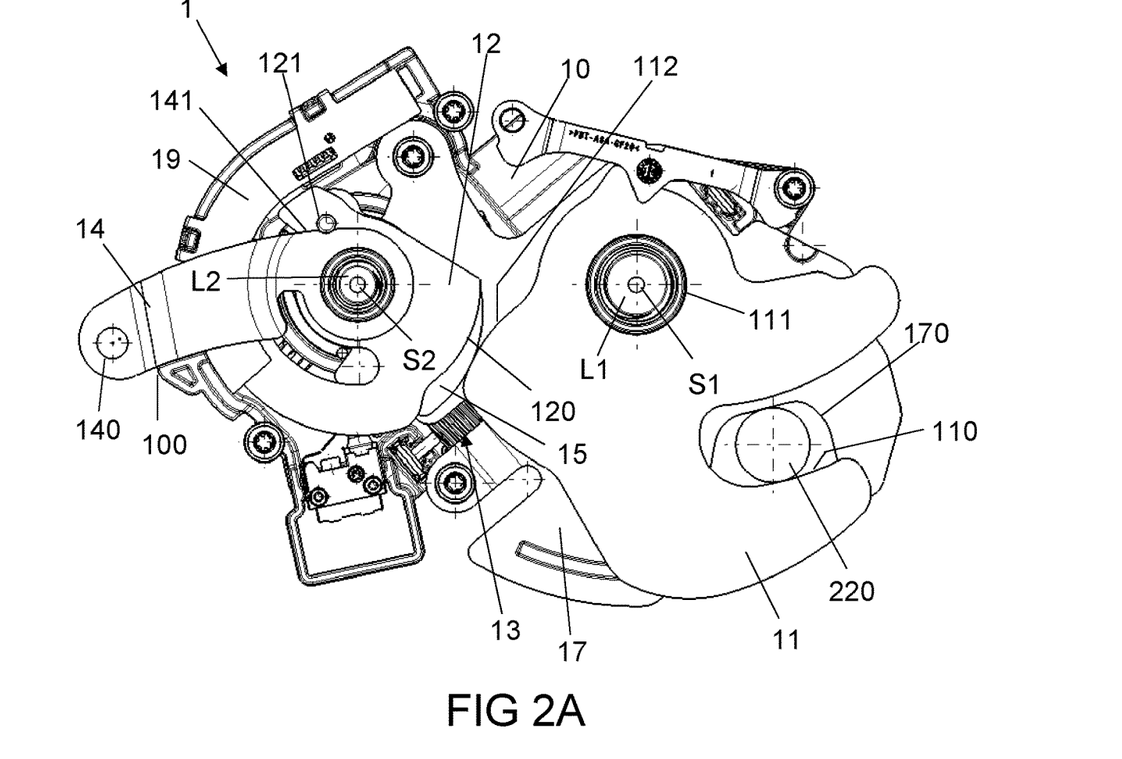
FIGS. 2A-2C show top views of components of the locking device of the vehicle seat of FIGS. 1A and 1B.

FIG. 2A shows the locking device 1 of the vehicle seat 2, wherein a lid is removed in order to reveal internal components. In FIG. 2A, the locking device 1 is shown in a state locked with a counter-locking element, in the present case a bolt 220 of the base 22 of the vehicle seat 2.

The locking device 1 comprises a housing 10 and a rotary latch 11 pivotally mounted on the housing 10 between a locking position and an unlocking position. In the present case, the rotary latch 11 is pivotally mounted on the housing 10 about a (first) pivot axis S1, in the present case by means of a bearing 111 on a housing-mounted bearing pin L1. The rotary latch 11 includes a rotary latch mouth 110 in which the counter-locking element can be received, here the bolt 220 of the base 22 of the vehicle seat 2. The counter-locking element (the bolt 220) also is received in an opening 170 of a locking plate 17 of the locking device 1, which is attached to the housing 10. In the locked state, edges of the opening 170 and of the rotary latch mouth 110 define a closed receptacle for the counter-locking element (the bolt 220).

Furthermore, the locking device 1 comprises a blocking element 12 movable between a blocking position and a release position. In the present case, the blocking element 12 is pivotally mounted on the housing 10 about a (second) pivot axis S2. When the blocking element 12 is arranged in the blocking position, it locks the rotary latch 11 in its locking position. For this purpose, the blocking element 12 includes a blocking area 120 which in the blocking position faces the rotary latch 11, concretely a shoulder 112 of the rotary latch 11. The shoulder 112, the rotary latch mouth 110 and the bearing 111 describe a triangle. The shoulder 112 and the rotary latch mouth 110 each are arranged eccentrically with respect to the axis of rotation S1 of the rotary latch 11. In the present case, the blocking area 120 of the blocking element 12 describes a circular portion that is formed concentrically with respect to the pivot axis S2 of the blocking element 12. The blocking element 12 can also be referred to as a locking pawl.

The locking device 1 furthermore comprises an electric driving device 13, which can be activated for moving (here: for pivoting) the blocking element 12 from the blocking position into the release position. The driving device 13 will yet be explained in more detail below. By means of the driving device 13, the blocking element 12 can be adjustable in response to an electrical signal. The driving device 13 provides for a comfortable motorized adjustment of the blocking element 12.

Furthermore, the locking device 1 comprises an additional unlocking element 14 that is pivotally mounted on the housing 10 independently of the driving device 13 and is adapted to transfer the blocking element 12 from the blocking position into the release position. The movement of the unlocking element 14 thus is independent of the position of the driving device 13. For example, when a power supply of the driving device 13 fails or the driving device 13 suffers a defect, the blocking element 12 can also independently be pivoted into the release position by means of the unlocking element 14.

In the present case, the unlocking element 14 can be pivoted about the same pivot axis S2 as the blocking element. The blocking element 12 and the unlocking element 14 hence are mounted on the housing 10 so that they can pivot coaxially with respect to each other.

The unlocking element 14 is configured in the form of a lever, i.e. here in the form of an unlocking lever. The unlocking element 14 is rigid. The unlocking element 14 includes an actuating portion 141 that cooperates with a driver element 121 of the blocking element 12. In the present case, the actuating portion 141 of the unlocking element 14 urges against the driver element 121 when the unlocking element 14 is moved from a normal position shown in FIG. 2A into an actuating position pivoted with respect to the normal position. The driver element 121 is arranged eccentrically with respect to the pivot axis S2 of the blocking element 12. With reference to FIG. 2A it can be seen that the unlocking element 14 has a greater lever length than the driver element 121. The distance from the pivot axis S2 to the driver element 121 is smaller than the distance from the pivot axis S2 to an opening 140 of the unlocking element 14 (and to an end of the unlocking element 14 facing away from the pivot axis S2). The opening 140 of the unlocking element 14 is formed at the end of the unlocking element 14 facing away from the pivot axis S2. It serves for connection to a traction means or to another actuating element.

In the present case, the driver element 121 is configured in the form of a pin that protrudes from the remaining blocking element 12, namely here in a direction parallel to the pivot axis S2. The actuating portion 141 of the unlocking element 14 is formed by a lateral surface of the unlocking element 14, which can abut against the shell surface of the pin-shaped driver element 121.

In the normal position, the unlocking element 14 abuts against a stop 100 of the housing 10, in the present case against a side of the unlocking element 14 opposite the actuating portion 141.

Figure 2B:
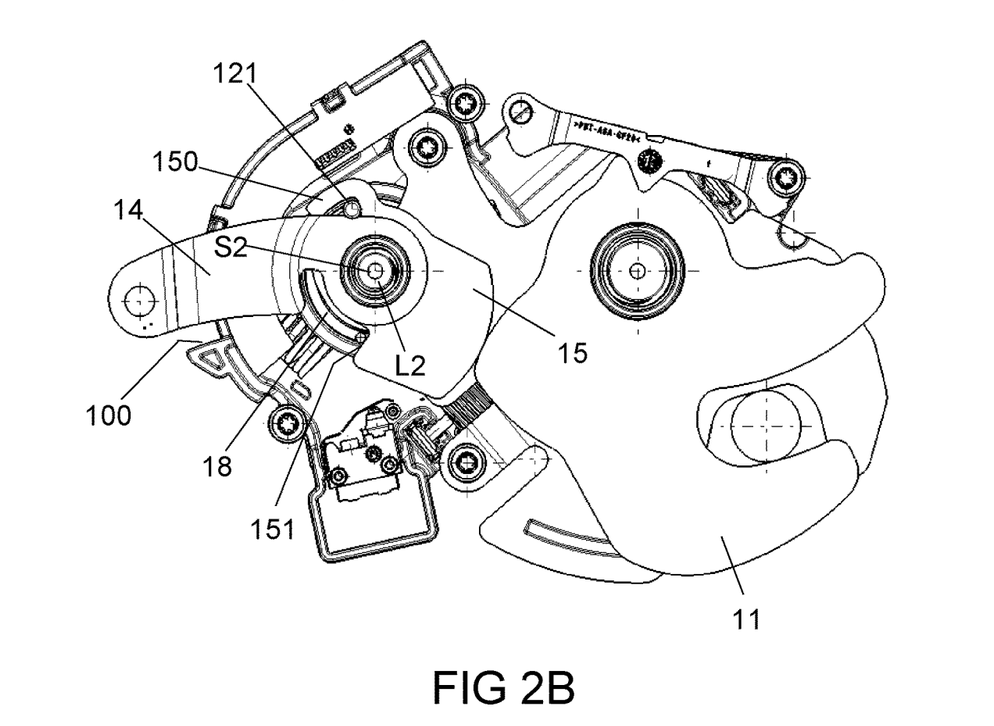

FIG. 2B merely shows the driver element 121 of the blocking element 12, while the remaining blocking element 12 is not shown in order to reveal underlying areas. There is in particular shown a clearance compensation element 15. The clearance compensation element 15 is adapted to hold the rotary latch 11 in the locking position without any clearance. To provide for a particularly smooth adjustment of the blocking element 12 without jamming, a gap is formed between the blocking area 120 of the blocking element 12 and the shoulder 112 of the rotary latch 11 in the blocking position of the blocking element 12. When the bolt 220 applies a force on the rotary latch 11, this gap is closed and the shoulder 112 gets in contact with the blocking area 120.

To prevent this gap (and the corresponding clearance) from causing any rattling or the like, the clearance compensation element 15 is provided. In the blocking position, said clearance compensation element is in contact with the shoulder 112 (or has a much smaller clearance to the same than the blocking element 12). However, the clearance compensation element 15 is not designed to withstand major loads. It is thinner and optionally formed from a softer material than the blocking element 12 (e.g. formed from plastic instead of metal, for example steel).

The clearance compensation element 15 likewise is pivotally mounted about the (second) pivot axis S2 of the blocking element 12 and of the unlocking element 14, in the present case on the same bearing pin L2. The clearance compensation element 15 has a hook 150. A portion of the driver element 121 engages into this hook 150. When the blocking element 12 hence is pivoted from the blocking position into the release position, it entrains the clearance compensation element 15 into the pivotal movement. The portion of the driver element 121 to be brought into engagement with the hook 150 protrudes from a side of the blocking element 12 that faces the side of the blocking element 12 with the portion of the driver element 121 cooperating with the unlocking element 14. Furthermore, the clearance compensation element 15 has a surface 151 that cooperates with a bent end portion of an annular spring 18 for resetting the clearance compensation element 15 into the normal position.

Figure 2C:
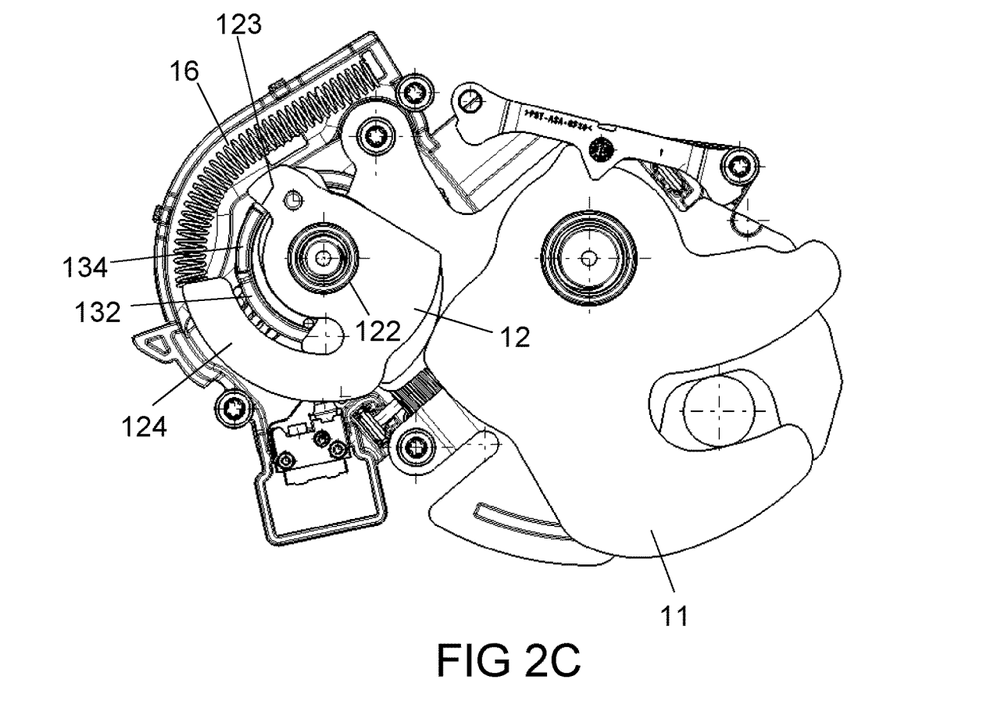

FIG. 2C does not show the unlocking element 14 in order to reveal underlying areas. For the same reason, there is not shown a cover 19 illustrated in FIGS. 2A and 2B, under which a spring 16 is arranged.

The spring 16 is received in a receptacle of the housing 10. In the present example, the spring 16 is a spiral spring. The spring 16 is guided over a linear portion and over a circular arc-shaped portion of the receptacle. In particular, it can be seen in FIG. 2C that the blocking element 12 has an arm 124. The arm 124 extends along a circular arc. The spring 16 is supported at the end of the arm 124 (with its end). The blocking element 12 is pretensioned in the direction of its blocking position by means of the spring 16. When the blocking element 12 is rotated from the blocking position into the release position against the force of the spring 16, it compresses the spring 16.

The blocking element 12 includes a bearing 122 by means of which it is rotatably mounted on the (second) bearing pin L2.

FIG. 2C furthermore reveals that a protrusion 134 of a screw wheel 132 of the driving device 13 described in more detail below cooperates with an actuating area 123 of the blocking element 12. In the blocking position of the blocking element 12 and of the driving device 13, a distance is formed between the protrusion 134 and the actuating area 123. When the driving device 13 is activated, the screw wheel is rotated about the (second) pivot axis S2 so that the protrusion 134 gets in contact with the actuating area 123 and entrains the same in the direction of the release position. The distance between the protrusion 134 and the actuating area 123 ensures that in the blocking position the blocking element 12 urges the unlocking lever 14 against the stop 100 at the housing 10.

In the synopsis of FIGS. 2A and 2C it can be seen that a surface of the driver element 121, on which the unlocking element 14 acts during a pivotal movement, and the actuating area 123 of the blocking element 12 are arranged (axially) offset from each other parallel to the pivot axis S2 of the blocking element 12.

Figure 3:
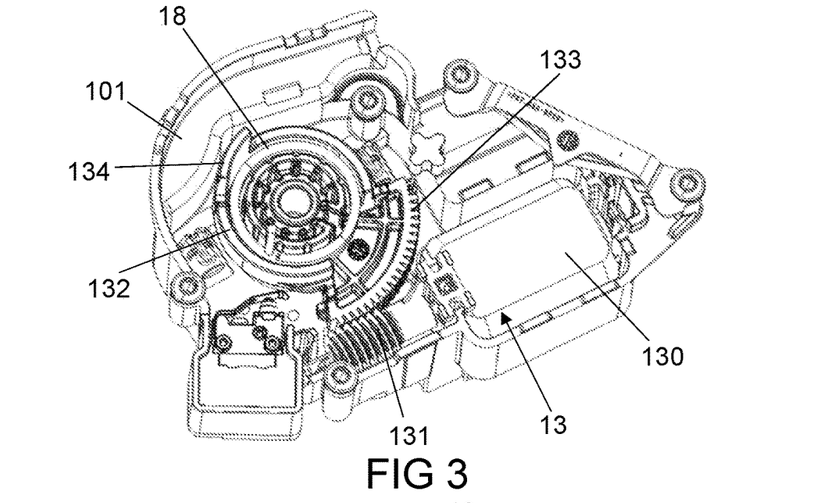
FIG. 3 shows a housing shell and a driving device of the locking device of FIG. 2A.

In FIG. 3, several components are not shown in order to reveal the driving device 13. The same is mounted on a housing shell 101 of the housing 10 and includes a drive unit 130. The drive unit 130 comprises an electric motor. The driving device 13 furthermore comprises a worm 131 to be driven by the drive unit 130. The worm 131 in turn is in engagement with a toothing 133 of the screw wheel 132. When the driving device 13 is activated, the drive unit 130 puts the worm 131 into rotation so that the helical gear 132 is put into a rotation about the pivot axis S2 of the blocking element 12.

FIG. 3 also shows that the annular spring 18 is fixed to the screw wheel 132.

In FIGS. 2A, 2B, 4A and 4B it can be seen that the unlocking element 14 includes an incision into which the bent end portion of the annular spring 18 can engage when the blocking element 12 is moved into the release position by means of the driving device 13.

Figure 4A:
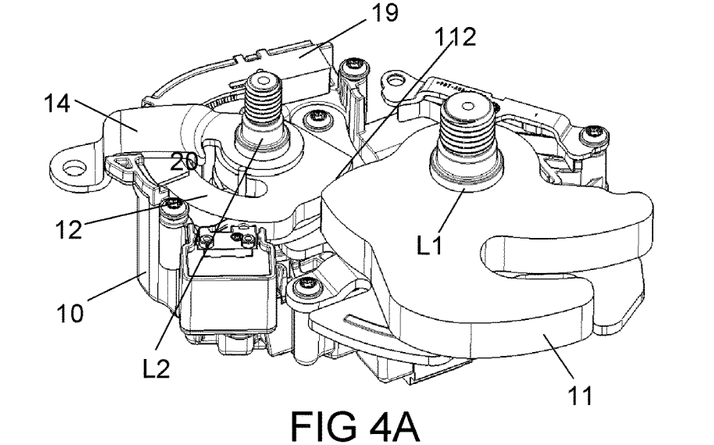
FIGS. 4A-4D show perspective views of components of the locking device of FIG. 2A.
Figure 4B:
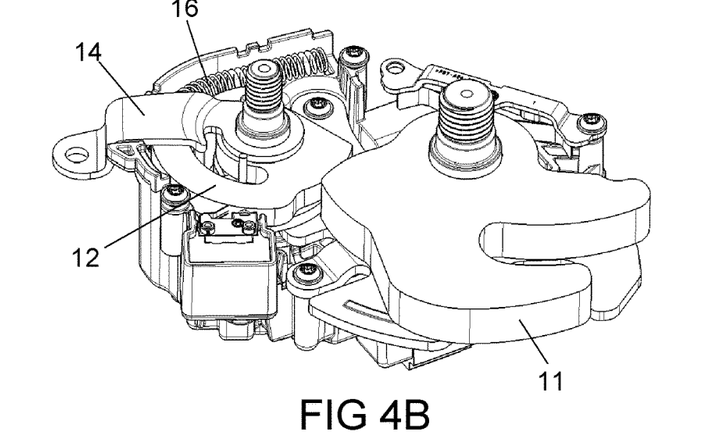
Figure 4C:
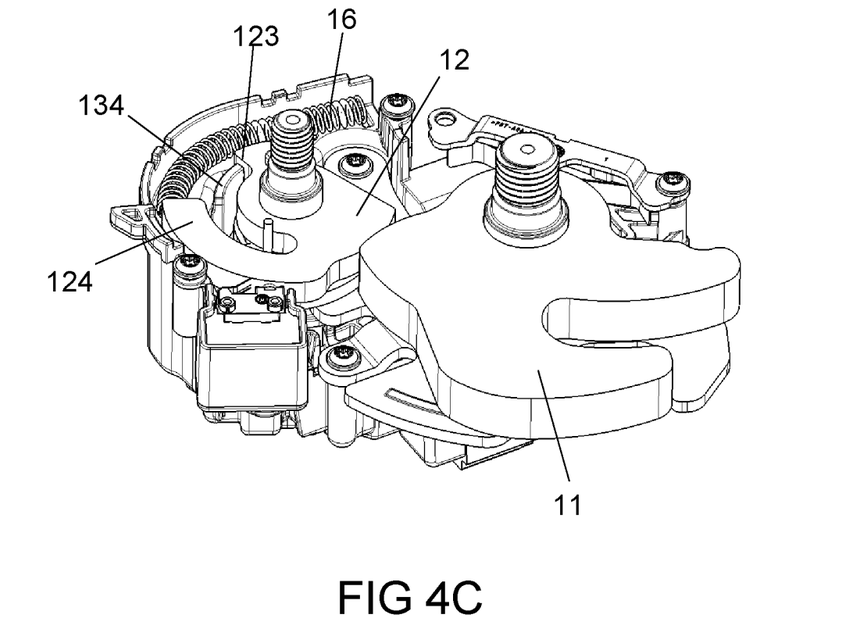

FIG. 4C shows the stop of the protrusion 134 of the screw wheel 132 with the actuating area 123 of the blocking element 12 as already explained above. The protrusion 134 protrudes from the remaining screw wheel 132 in a direction parallel to the pivot axis S2. The protrusion 134 extends in the form of a circular arc.

Figure 4D:
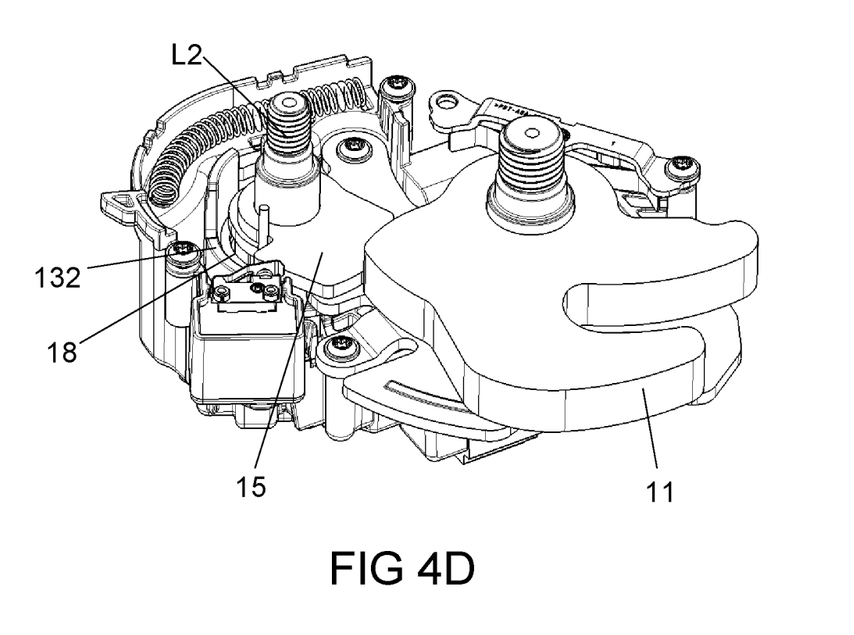

FIG. 4D shows the above-mentioned cooperation of the bent end portion of the annular spring 18 with the clearance compensation element 15. The bent end portion of the annular spring 18 extends in a direction parallel to the pivot axis S2.

The (first) pivot axis S1 of the rotary latch 11 and the (second) pivot axis S2 of the blocking element 12 (and of the unlocking element 14, of the clearance compensation element 15 and of the screw wheel 132) extend parallel to each other.

Figure 5:
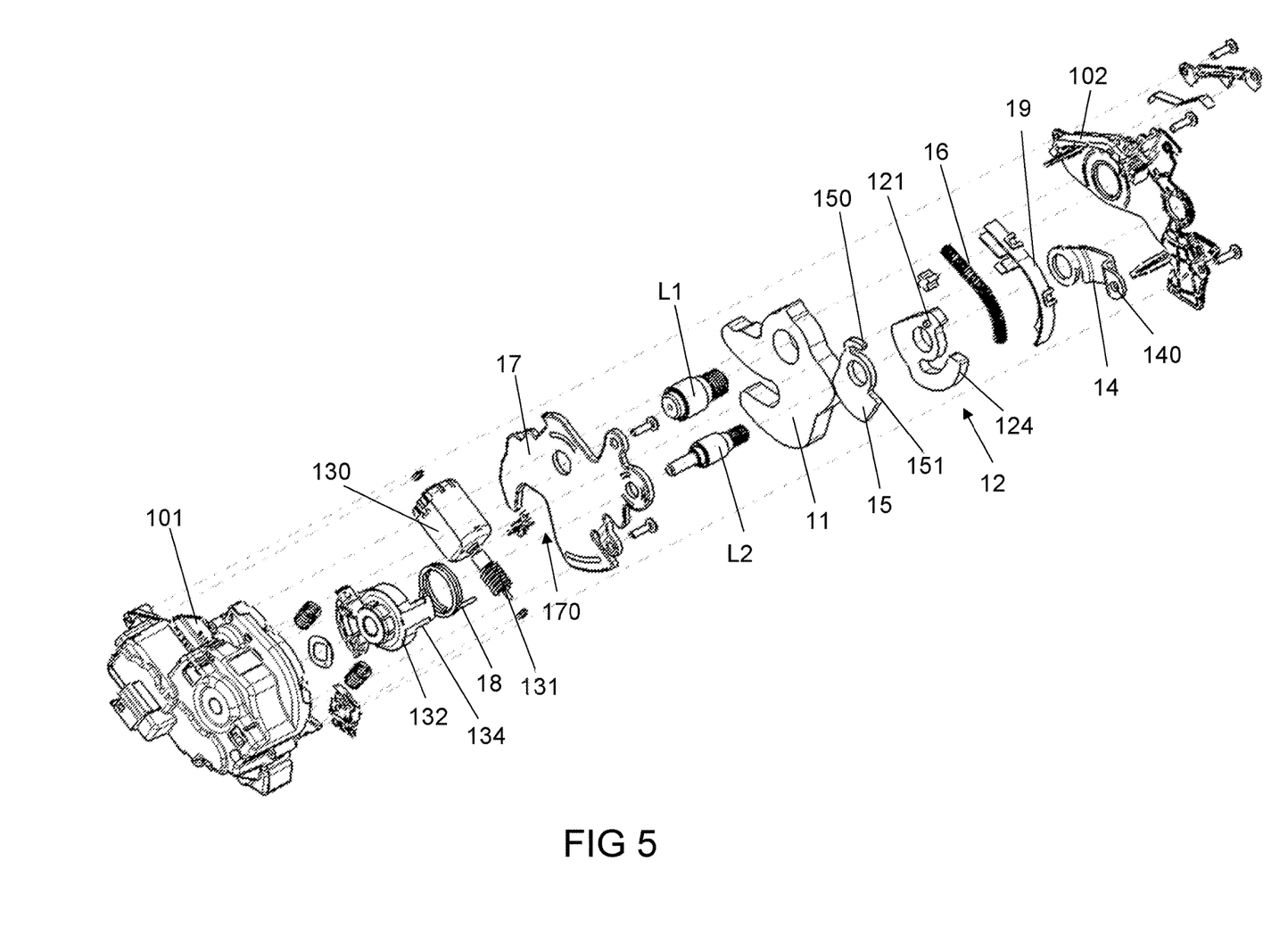
FIG. 5 shows an exploded representation of the components of the locking device of FIG. 2A.

FIG. 5 shows the individual components of the locking device. Apparently, the housing 10 comprises the housing shell 101 and a lid 102. The components already described above are arranged inbetween. The driving device 13 is accommodated in the housing shell 101 and covered by the locking plate 17. Merely the protrusion 134 and the bent end portion of the annular spring protrude beyond the locking plate. Between the locking plate 17 and the lid 102, the rotary latch 11, the blocking element 12 and the unlocking element 13 are arranged.

FIGS. 6A to 6F illustrate the process of motorized unlocking and locking of the locking device 1 by means of the bolt 220.

Figure 6A:
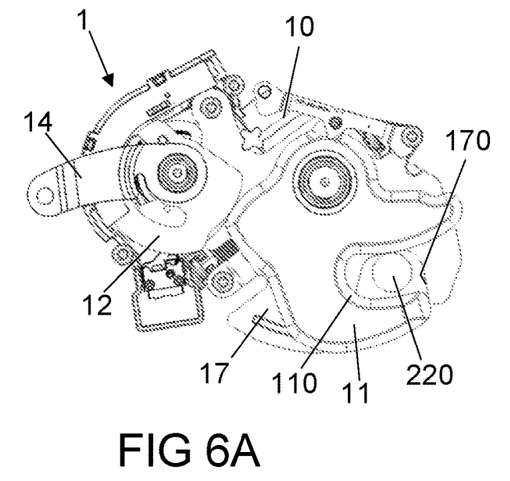
FIGS. 6A-6F show the locking device of FIG. 2A and a bolt to be locked therewith in several stages of motorized unlocking and locking.

In FIG. 6A, the locking device 1 is locked by means of the bolt 220 and the blocking element 12 is arranged in the blocking position.

Figure 6B:
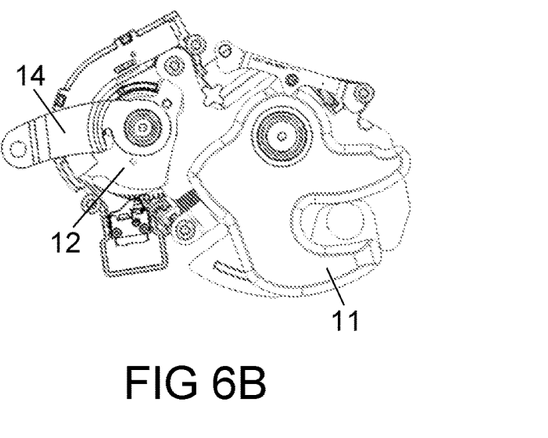

In FIG. 6B, the driving device 13 has been activated already so that the blocking element 12 has been rotated from the blocking position into the release position. In this position, the rotary latch 11 can be opened and the bolt 220 can be removed. For example, a pull on the locking device 1 or on the bolt 220 causes the bolt 220 to open the rotary latch 11.

Figures 6C, 6D:
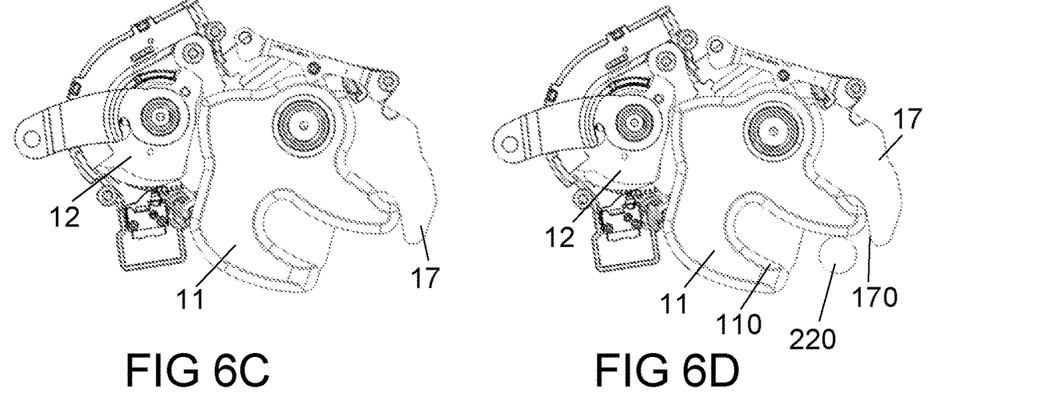

In FIG. 6C, the rotary latch is arranged in the unlocking position and the locking device 1 is removed from the bolt 220.

In FIG. 6D the locking device is again attached to the bolt 220 with the rotary latch 11 in the unlocking position.

Figure 6E:
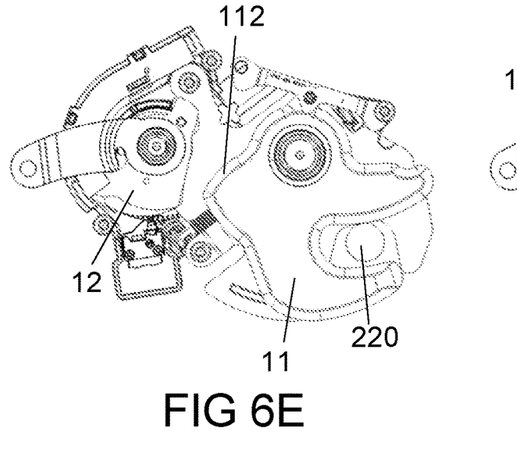

Pressing against the bolt 220 with the rotary latch 11 makes the rotary latch 11 rotate from the unlocking position of FIG. 6D back in the direction of the locking position of FIG. 6E.

In FIG. 6E, the rotary latch again is in the locking position, but the blocking element 12 still is in the release position.

Figure 6F:
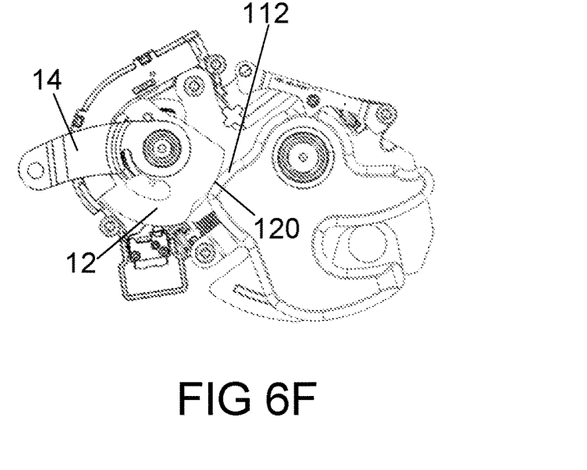

As a result of an activation of the drive unit 13 in the reverse direction, the screw wheel 132 enables resetting by the spring 16 and the blocking element 12 is pivoted back into the blocking position.

In all stages of the motorized actuation of the blocking element 12 the unlocking element 14 remains in the same position, the normal position.

Figure 7A:
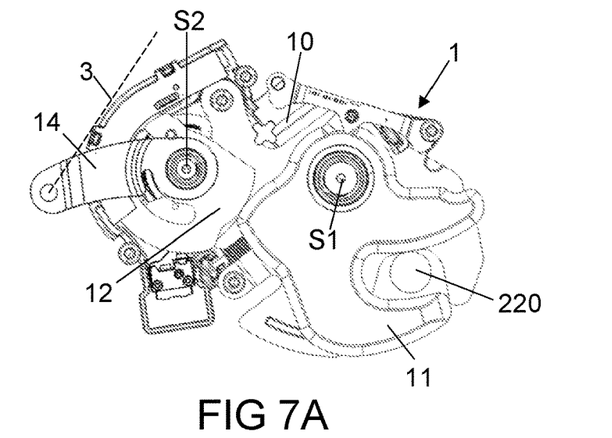
FIGS. 7A-7C show the locking device of FIG. 2A and a bolt to be locked therewith in several stages of manual unlocking and locking.
Figure 7B:
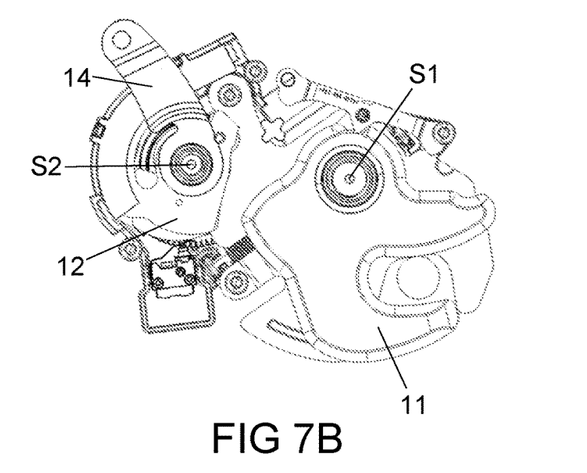
Figure 7C:
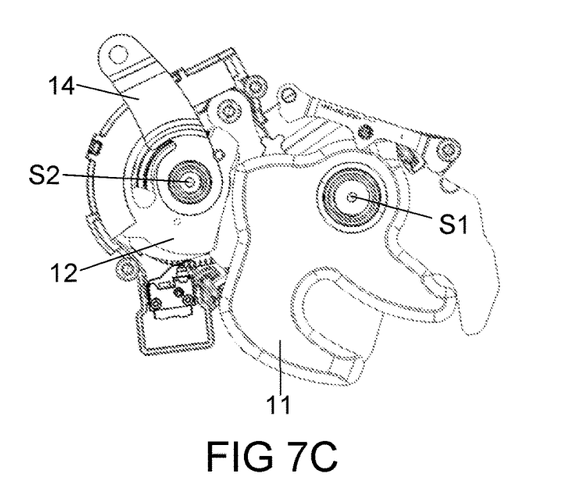

FIGS. 7A to 7C correspond to FIGS. 6A to 6C, wherein the blocking element here is not moved by means of the driving device 13, but by means of the unlocking element 14. The unlocking element 14 acts on the blocking element 12 independently of the driving device 13. Even if the driving device 13 remains deactivated, the blocking element can be moved from the blocking position into the release position by means of the unlocking element 14. This is effected e.g. by means of a flexible traction means 3 (see by way of example FIG. 7A), which in the present case engages the opening 140 of the unlocking element 14. The flexible traction means 3 in the present case is the core of a Bowden cable. The same for example is coupled to a handle or lever or the like, in order to provide an emergency release. Alternatively or additionally, the actuation of the unlocking element 14 is effected by means of seat kinematics of the vehicle seat 2.

In the described solution, the blocking element 12 and the clearance compensation element 15 are decoupled from transmission parts of the driving device 13 and thus can be actuated independently of the gear position of the driving device 13. The driving device 13 and the unlocking element 14 act on the blocking element 12 independently of each other (and at different points). This provides for manual locking independently of an electrical actuation. It likewise is advantageous that the drive unit 13 and the unlocking element 14 can both be moved into the normal position, while the rotary latch 11 is still open. When the same is closed, the blocking element 12 spring-elastically snaps into the blocking position. For this purpose, the rotary latch 11 in the illustrated example has a shoulder facing the blocking element 12 and also is urged by a likewise optional spring (here a leaf spring) mounted on the housing 10, which acts on a protrusion at the rotary latch 11, into the locking position or the unlocking position depending on the pivot position. The blocking element 12 rests against the shoulder when the drive unit 13 and the unlocking element 14 both are arranged in the normal position with the rotary latch 11 open, so that the rotary latch 11 is spring-elastically held in the unlocking position by the blocking element 12 by means of the spring 16. When the rotary latch 11 is moved into the locking position e.g. by the bolt 220, the shoulder of the rotary latch 11 slides along the blocking element 12, which then initially backs away spring-elastically by means of the spring 16 and then snaps into the blocking position as soon as the rotary latch 11 takes the locking position.

Due to the described locking device 1, the vehicle seat 2 can be of the fully electrically adjustable type. For pivoting forwards into the easy-entry position the locking device 1 can be opened electrically, and the seat part 20 (together with the backrest 21) then is moved by a motor out of the position of use into the easy-entry position. For returning into the position of use, the seat part 20 (together with the backrest 21) is moved by a motor out of the easy-entry position into the position of use, and in the position of use the locking device 1 again locks by means of the bolt 220.

Alternatively, a partially electric adjustment can be provided. For example, unlocking of the locking device 1 can be effected electrically, and pivoting forwards into the easy-entry position is effected manually and/or by a support spring. Returning into the position of use then is effected manually (or electrically by means of an optional motor).

After unlocking, the locking device 1 can be actuated (in particular electrically) for pivoting forward into the easy-entry position, e.g. can be transferred into the ready-to-lock state. This can be effected by a control signal triggered in the easy-entry position, alternatively or additionally by a time-controlled signal or by actuation of a switch (e.g. a micro-switch).

Other applications of the locking device 1, e.g. for locking pivotable or foldable closing elements, such as doors, lift-gates, trunk lids or hoods, likewise are conceivable.

LIST OF REFERENCE NUMERALS 1 locking device
10 housing
100 stop
101 housing shell
102 lid
11 rotary latch
110 rotary latch mouth
111 bearing
112 shoulder
12 blocking element
120 blocking area
121 driver element
122 bearing
123 actuating area
124 arm
13 driving device
130 drive unit
131 worm
132 screw wheel
133 toothing
134 protrusion
14 unlocking element
140 opening
141 actuating portion
15 clearance compensation element
150 hook
151 surface
16 spring
17 locking plate
170 opening
18 annular spring
19 cover
2 vehicle seat
20 seat part
21 backrest
22 base
220 bolt
23 longitudinal adjustment device
3 traction means
4 vehicle floor
L1, L2 bearing pin
S1, S2 pivot axis

The invention claimed is:

1. A locking device for a vehicle seat, comprising:
a rotary latch pivotally mounted on a housing between a locking position and an unlocking position,
a blocking element movable between a blocking position and a release position, by which blocking element the rotary latch is blocked in the locking position when the blocking element is arranged in the blocking position,
a driving device that can be activated for moving the blocking element from the blocking position into the release position, and
an unlocking element that is pivotally mounted on the housing independently of the driving device and is adapted to urge the blocking element from the blocking position into the release position.

2. The locking device according to claim 1, wherein the blocking element and the unlocking element are mounted on the housing such that they can pivot coaxially with respect to each other.

3. The locking device according to claim 1, wherein the unlocking element is configured in the form of an unlocking lever.

4. The locking device according to claim 1, wherein the blocking element comprises a driver element on which the unlocking element acts during a pivotal movement.

5. The locking device according to claim 4, wherein the unlocking element has a greater lever length than the driver element.

6. The locking device according to claim 5, wherein the driving device comprises a screw wheel that is pivotally mounted on the housing in such a way that it acts on an actuating area of the blocking element as a result of an activation of a drive unit, wherein a surface of the driver element, on which the unlocking element acts during a pivotal movement, and the actuating area of the blocking element are arranged axially offset from each other with respect to a pivot axis of the blocking element.

7. The locking device according to claim 1, wherein the driving device comprises a screw wheel that is pivotally mounted on the housing in such a way that it acts on an actuating area of the blocking element as a result of an activation of a drive unit.

8. The locking device according to claim 7, wherein a worm of the driving device is in engagement with a toothing of the screw wheel.

9. The locking device according to claim 7, wherein the screw wheel and the blocking element are mounted on the housing such that they can pivot coaxially with respect to each other.

10. The locking device according to claim 1, wherein a stop for the unlocking element is formed on the housing.

11. The locking device according to claim 1, further comprising a spring by means of which the blocking element is pretensioned in the direction of the blocking position.

12. The locking device according to claim 1, further comprising a clearance compensation element, which is adapted for holding the rotary latch in the locking position without any clearance.

13. The locking device according to claim 12, wherein the blocking element entrains the clearance compensation element during a movement from the blocking position into the release position.

14. The locking device according to claim 1, wherein the driving device and the unlocking element are each movable between a normal position and an actuating position and in the respective actuating position urge the blocking element into the release position, wherein the rotary latch, when it is arranged in the unlocking position, is held in the unlocking position when the driving device and the unlocking element are arranged in the respective normal position, and wherein the blocking element is spring-elastically transferred into the blocking position when the rotary latch is moved into the locking position.

15. The locking device according to claim 1, further comprising a flexible traction means coupled to the unlocking element, by means of which the unlocking element can be put into a pivotal movement.

16. A vehicle seat, comprising the locking device according to claim 1.

17. The vehicle seat according to claim 16, wherein a seat part of the vehicle seat is connectable or connected to a vehicle floor via a base of the vehicle seat, wherein the seat part can be locked to the base by means of the locking device.

\* \* \* \* \*